Dec. 9, 1924. 1,518,686
J. E. BLAND
GASOLINE TANK
Filed Nov. 16, 1922
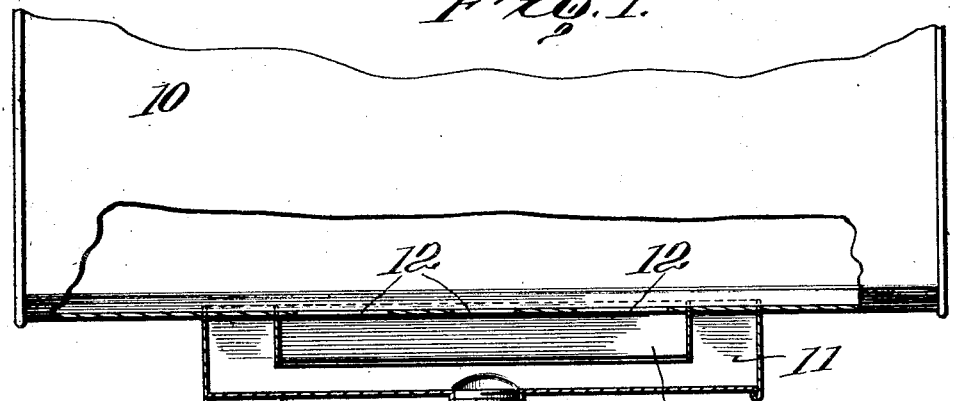
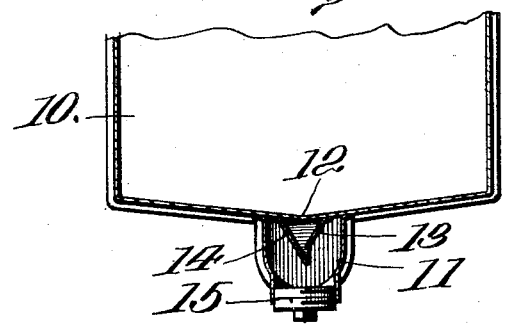
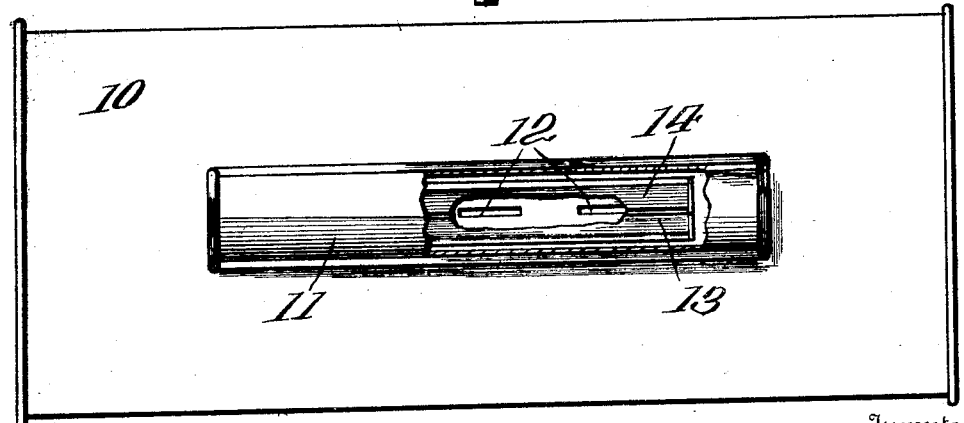
Inventor
John E. Bland
By Walter F. Rogers
his Attorney Patented Dec. 9, 1924.

1,518,686

UNITED STATES PATENT OFFICE.

JOHN E. BLAND, OF ARDMORE, OKLAHOMA.

GASOLINE TANK.

Application filed November 16, 1922. Serial No. 601,284.

*To all whom it may concern:*

Be it known that I, JOHN E. BLAND, a citizen of the United States, and resident of Ardmore, county of Carter, and State of Oklahoma, have invented new and useful Improvements in Gasoline Tanks, of which the following is a specification.

This invention relates to an improvement in gasoline tanks and the object is to provide an auxiliary tank or trap in connection with the main tank for the purpose of collecting the sediment and water contained in the gasoline tank and preventing the return of the sediment to the main tank.

The invention consists of certain novel features of construction and combination of parts which will be hereinafter described and pointed out in the claim.

In the accompanying drawings:

Figure 1, is a longitudinal vertical sectional view;

Figure 2, is a transverse section; and

Figure 3, is a bottom plan view in detail showing the openings in the bottom of the main tank.

In the drawings 10 represents the main gasoline tank of usual construction and 11 represents the auxiliary tank which is attached to the bottom of the main tank. The auxiliary tank 11 is of less length than the main tank and is preferably about two and one-half inches wide and two and one-half inches in depth, although I do not care to be limited to the exact size mentioned.

The bottom of the tank 10 is provided with a plurality of elongated openings 12 which may be of different lengths.

Connected to the bottom of the tank 10 and extending obliquely therefrom toward each other are two baffle plates 13 and 14. The baffle plate 14 is of greater width than the baffle plate 13, but the plate 13 is of such width that an opening is formed between the two plates for the water and sediment of the main tank 10 to pass through the openings 12 and into the auxiliary tank or trap 11. The arrangement of the two baffle plates 13 and 14 prevents any of the liquid or sediment contained in the tank 11 from passing into the tank 10. The baffle plates 13 and 14 are connected together at their ends so that the only passage or opening is formed between the longitudinal edge of the plate 13 and the side of the longer plate 14. The baffle plates 13 and 14 project or extend only a short distance beyond the outermost openings 12 formed in the tank 10 and are not of the same length as the auxiliary tank 11.

A plug 15 has screw threaded engagement with the bottom of the auxiliary tank 11 whereby the sediment and water may be drained from the tank at any time.

This invention is intended to protect the feed lines between the gasoline tank and the carbureter by retaining the sediment and water in a separate compartment from the gasoline. The dirt and water are therefore prevented from being held in suspension in the gasoline in the main tank due to the agitation of the gasoline by the motion of the car. The dirt and water are heavier than the gasoline and will naturally seek the lowest point in the tank and by providing the openings 12 in the bottom of the tank 10 the sediment and water will enter the auxiliary tank 11. The size of the auxiliary tank maintains the sediment and water in a small space and keeps it intact, regardless of the quantity of gasoline in the main tank 10. The tank 11 will naturally be full at all times, regardless of the motion or vibration that is imparted to the tank, the baffles 13 and 14 will prevent the water and sediment in the auxiliary tank 11 from entering the tank 10, as the baffle plates act as deflectors to prevent the egress of the sediment and water from the auxiliary tank into the main tank.

Having described my invention, what I claim as new and desire to secure by Letters Patent is:

A gasoline tank comprising a main tank having an opening in the bottom thereof, baffles connected to the exterior of the tank and connected together at the ends, one of the baffles located adjacent one side of the opening and the other baffle on the opposite side, said baffles extending obliquely from the tank and toward each other and over the opening in the tank, and an auxiliary tank connected to the main tank beneath said opening and baffles to receive the sediment of the main tank.

JOHN E. BLAND.